United States Patent [19]
Wilke

[11] 3,792,244
[45] Feb. 12, 1974

[54] CIRCUIT FOR PH VALUE REGULATION

[75] Inventor: Karl Wilke, Do-Aplerbeck, Germany

[73] Assignee: Fridrich Uhde GmbH, Dortmund, Germany

[22] Filed: June 2, 1972

[21] Appl. No.: 259,150

[52] U.S. Cl............ 235/151.3, 235/197, 235/200 PF
[51] Int. Cl............................................. G06f 15/46
[58] Field of Search 235/151.3, 151.35, 197, 200 R, 235/200 PF; 317/137, 138; 324/30 R; 307/220, 230; 328/142, 145

[56] References Cited
UNITED STATES PATENTS

| | | | |
|---|---|---|---|
| 3,491,944 | 1/1970 | Fudim | 235/200 R |
| 3,244,867 | 4/1966 | Lavin | 235/197 |
| 3,250,469 | 5/1966 | Colston | 235/200 PF |
| 3,654,445 | 4/1972 | Mikkelson et al. | 235/151.3 |
| 3,503,423 | 3/1970 | Edell | 235/200 PF X |
| 3,687,363 | 8/1972 | Numata et al. | 235/200 PF |

Primary Examiner—Malcolm A. Morrison
Assistant Examiner—Jerry Smith
Attorney, Agent, or Firm—Malcolm W. Fraser

[57] ABSTRACT

Regulation of pH value of solutions along a titration curve. The pH value is measured to obtain a linear signal which is conveyed in inverted form in one path and non-inverted form in another path to a means for selecting its output from the path having the maximum value. This output is stretched, clipped and used to drive a pH regulator in a hyperbolic manner.

4 Claims, 8 Drawing Figures

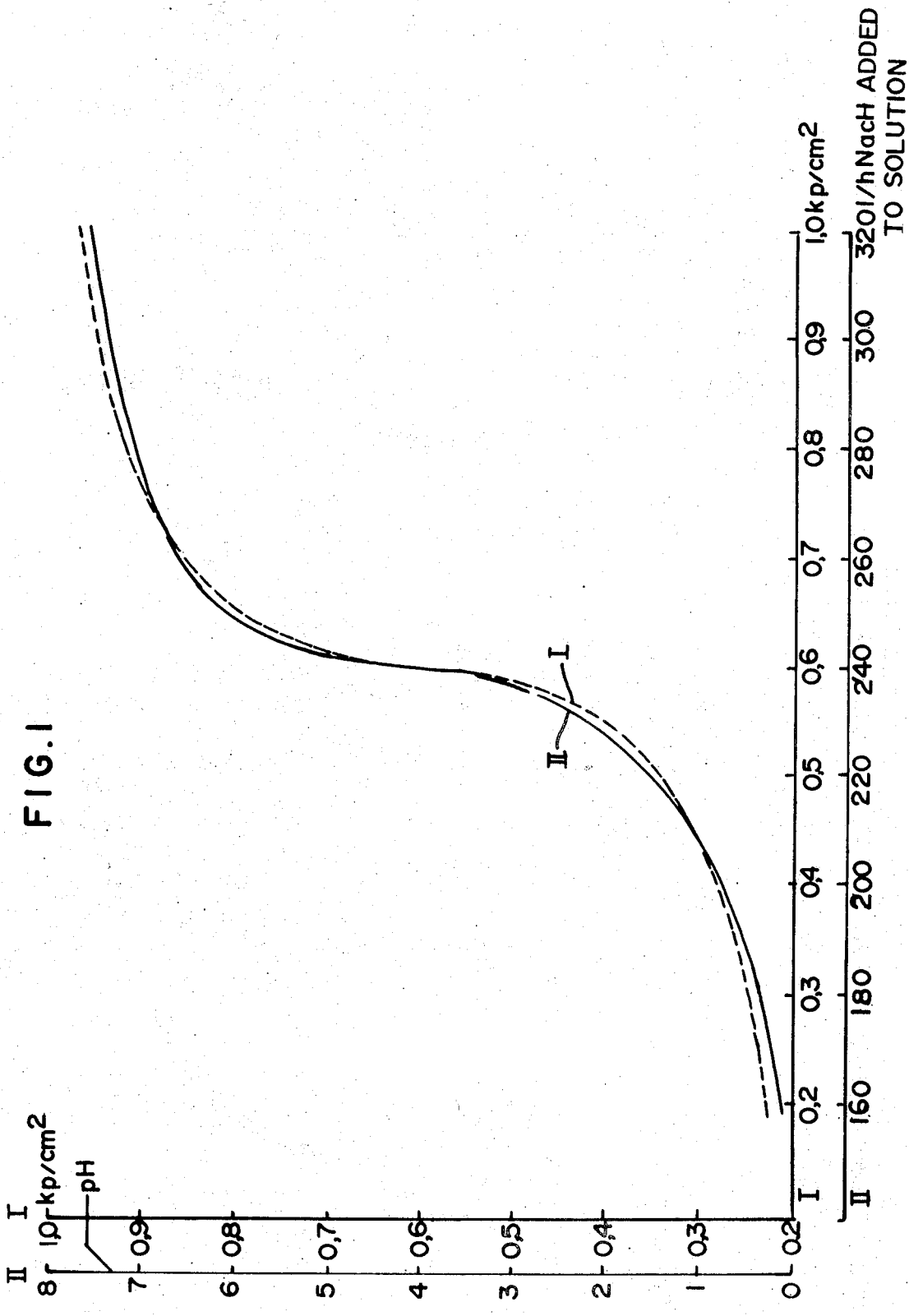
FIG. I

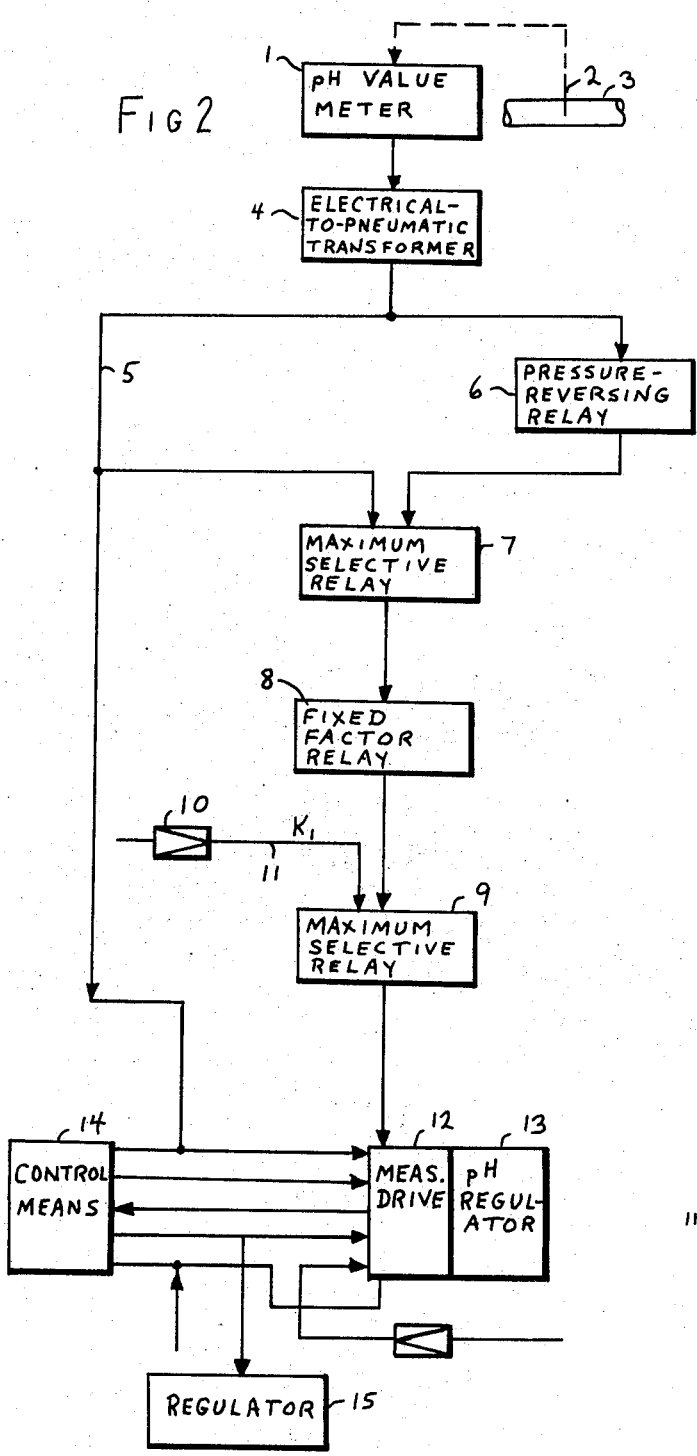

CIRCUIT FOR PH VALUE REGULATION

In solutions, which in the present case means mixtures, in liquid phase, of several components, the $pH$ value, since it is the material characteristic factor, often affects decisively the behavior of such mixtures in the further processing thereof. Thus, for instance, ammonium nitrate is produced from a mixture of $HNO_3$ and $NH_3$ at a specific $pH$ value. The brine in an alkaline chloride electrolysis with a specific $pH$ value is the prime material for production of chlorine and soda lye. The accuracy of the regulation of a specific $pH$ value is the measure of the manner in which the technical processes are to be carried out and therefore the meeasure of the needed quantity and energies to be employed, and of the quality of the products. Depending upon the $PH$ value required, a specific solution and mixture ratio must be maintained by regulated addition of at least one component.

Methods are known in which the component which affects the $pH$ value is added by way of a regulating valve. The regulating valve itself receives its impulses from a $pH$ measuring circuit. This measuring circuit itself receives the data from the pH measuring apparatus. Since the titration curve does not extend linearly but logarithmically, the $pH$ value change varies per time unit at equal regulation quantities according to the present $pH$ value. The $pH$ value change resulting from the added regulating quantity can become too small or too large for the ideal value. A change which is too small can be compensated by a more rapid regulating sequence. The more rapid regulating sequence influences the uniformity of the solution concentration in a favorable manner. A $pH$ value change which is too large results in larger regulating intervals which are unfavorable for proper concentration distribution with respect to time. The regulating valve moves in the most unfavorable case into an "ON-OFF" switching sequence.

A flowing solution, as it is always involved in production processes, presents locally varying concentrations, which affect the production process unfavorably or prevent an optimal reaction process when the $pH$ value deviates from the ideal value. Thus, for instance, losses of initial materials, such as $HNO_3$ and $NH_3$, occur in the case of ammonium nitrate production if the $pH$ valve regulation is not accurate. When the regulation, due to the logarithmic shape of the titration curve, exceeds the proportionally area and arrives at the "ON-OFF" switching sequence, the result is that the product has to be discarded as useless and the apparatus must be started over again by hand.

In an alkaline chloride electrolysis, the brine must be present at a specific $pH$ value. If this $pH$ value is not observed, difficulties result in carrying out the process.

SUMMARY OF THE INVENTION

The invention aims at converting the linear $pH$ signal from the $pH$ measuring apparatus into a signal for the regulating apparatus in such a manner that the regulation takes place in a manner at least approximate to that of a logarithmic curve. Since a hyperbola is at least a close approximation to the logarithmic curve, it is sufficient to obtain such a regulating curve. The $pH$ regulation is to take place in a fully automatic manner, so as to simplify attendance to and service of a chemical apparatus, and simultaneously to produce an end product of high quality. Overcontrol or undercontrol of the titration curve must be minimized.

This task is accomplished according to the invention in the following manner: the linear signal is conveyed, by way of a double path, in one instance directly and in another instance inversely, to a maximum selective relay; the remaining signal is stretched for further processing in a fixed factor relay to the zero line; the signal is changed to an end signal according to FIG. 2 in a following maximum selective relay by means of a constant value fed to this maximum selective relay, and then it acts as an input signal by way of a measuring drive upon the $pH$ regulator.

In order to carry out the method in a further development of the invention, a circuit is chosen in which a pneumatic pressure reversal relay is added to one of the outputs of the double output of the pneumatic measuring converter, while the other output with the output of the pneumatic pressure reversal relay is conveyed into a pneumatic selective relay. This output leads, by way of a pneumatic fixed factor relay, to a second pneumatic maximum selective relay which contains a further constant adjustable value. The output of the second selective relay is connected, by way of a measuring drive, to the pneumatic pH regulator.

Besides a pneumatic regulation, in a further development of the invention, the method can be carried out also by means of electric regulation, in which case the important point is only that the linear $pH$ value signal be converted into a hyperbola-like signal from the regulating apparatus.

The advantages achieved by the invention consist especially in that, by means of the method of the invention, linear signals from a $pH$ measurement can be shaped in such a way that a logarithmic characteristic with positive and negative slope, as presented by a titration curve, can be corrected so as to approximate a hyperbola shape. The approximation is so close that the regulating circuit does not become unstable. The circuit of the invention permits the construction of a regulating circuit in a fully automatic embodiment with commercial mas-produced components. The regulating process is continuous, the regulating valve controls the supply of the regulating components continuously and does not pass into the discontinuous "ON-OFF" switching sequence. On the basis of the continuous component addition, a constant or continuously variable $pH$ value is reached. A variation about a mean value does not take place. A uniform product is obtained. Initial materials are not lost, for instance, on account of non-observed neutralization. Service of and attendance to the plant are simplified by the fully automatic regulation.

BRIEF DESCRIPTION OF THE DRAWINGS

The invention is described in greater detail by means of an example of a $pH$ value regulation for the brine of an alkaline chloride electrolysis.

FIG. 1 illustrates a $pH$ curve superimposed upon a working curve of a regulator (initial regulator curve) according to the present invention.

FIG. 2 illustrates a system according to the present invention.

FIGS. 2a, 2b, 2c, 2d 2e and 2f illustrate function curves of the elements in the system of FIG. 2, the curves being adjacent to the elements whose functions they represent. FIG. 2a corresponds to element 4, 2b to 6, 2c to 7, 2d to 8, 2e to 9 and 2f to 13.

DESCRIPTION OF THE PREFERRED EMBODIMENT

A circuit with function curves.

The pH curve I in FIG. 1 shows the ph value as a function of the NaOH addition. In the lower and upper pH value range, larger NaOH additions are required for a specific ph value alteration than in the middle range. The working curve, (indicated by II) of the pH regulator shows the control signal value as a function of the regulator output. FIG. 1 shows the symmetry of curve II and its good approximation to curve I. The regulating element or regulating valve automatically controls the required component proportioning.

According to FIG. 2, the pH measuring apparatus 1 receives a linear signal (as illustrated in FIG. 2) by way of a sensing device 2 located in a supply line 3 for the brine of the cell of the alkaline chloride electrolysis. In a measuring transformer 4, the electrical signal is transformed into a pneumatic signal with the end values of 0.2 and 0.1 $kp/cm^2$, as in curve FIG. 2a. By way of a double path, this signal leads in one instance directly by way of line 5 and in anothdr instance by way of a pressure reversing relay (having a function as in FIG. 2b) to a maximum selective relay 7, Selective relay 7 supplies a signal which drops for increasing pH values to between 1.0 to 0.6 $kp/cm^2$ and then rises again to 1.0 $kp/cm^2$(as illustrated in FIG. 2c). For further processing, this signal is transformed by means of a fixed factor relay 8 with a factor of e.g., 1:2 into the signal 1.0 to 0.2 to 1.0 $kp/cm^2$ (as illustrated in FIG. 2d). Fixed factor relay 8 is followed by a further maximum selective relay 9 to which, as a constant basic value, an adjustable pressure $K_1$ is supplied by way of a line 11. By means of a pressure reducer 10, a pressure $K_1$ is set and kept constant. The maximum selective relay suppresses those of the signal values arriving from the fixed factor relay which are lower than pressure $K_1$. The result achieved thereby consists in that, in the medium, almost linear, range of the pH value curve, changes in the pH value are transferred, with constant amplification, as regulating pulses to the regulating element (as illustrated in FIG. 2e ). The signal value above $k_1$ depart from the maximum selective relay and are conveyed, by way of measuring drive 12, to a pH regulator 13 which is connected to the control apparatus 14, and to a regulator 15. The function curve illustrated in FIG. 2f shows the control signal output of regulator 13. The pH regulator 13 is constructed as P-regulator with a controlled working point, provided that it serves as guiding regulator. When a valve is directly fed, the pH regulator is constructed as PI-regulator. By means of a spring provided at the measuring drive of the regulator, it is possible to spread the initial regulating values.

The conversion above-described of the linear pH signal from the pH measuring apparatus into a signal according to FIG. 2e transmitted to the pH regulator can likewise be carried out by means of electrical computing members. These computing members are commercial mass production components.

In the example described above, the invention has been explained in greater detail by means of an alkali-chloride electrolysis plant. It is clear that the invention can be modified for instance, in such a manner that dependency curves of mirror-inverted logarithmic or similar function which are obtained as linear signals, can be converted to corresponding approximation curves and thus be used as signals for regulating the dependency curves.

I claim:

1. System for regulating the pH value of a solution along a titration curve, comprising:
    A. means for obtaining a linear signal corresponding in a linear manner from 0 to 14 to the pH value of the solution,
    B. means responsive to the linear signal for providing a non-linear signal which changes linearly in value in one direction for pH values increasing from zero to an intermediate pH value, and which changes linearly in value in a direction opposite to the one direction for pH values increasing from the intermediate pH value to 14,
    C. means responsive to the non-linear signal for deriving a clipped non-linear signal in which the extreme value of the non-linear signal in said one direction is limited to a value no more extreme than a constant value, whereby the linear signal is clipped in the vicinity of the intermediate pH value, and
    D. ph regulator means responsive to the clipped non-linear signal for regulating pH values of said solution along a hyperbolic regulation curve.

2. System according to claim 1 wherein the means for obtaining a linear signal comprises:
    A. means for measuring the pH value of the solution to provide an electrical signal corresponding in a linear manner to the pH value of the solution, and
    B. electrical-to-pneumatic transformer means for converting said electrical signal to said linear signal in a pneumatic form, and
    wherein means B, C, and D operate pneumatically.

3. System according to claim 1 wherein the means responsive to the linear signal for providing a non-linear signal comprises:
    A. means responsive to the linear signal for reversing the linear signal to provide a reversed linear signal which changes with increasing pH values in a direction opposite to that of the original linear signal, and
    B. means responive to the original linear signal and to the reversed linear signal for providing, as said non-linear signal, the signal selected from the group consisting of the original linear signal and the reversed linear signal which has the larger value of the two signals.

4. System according to claim 3, wherein the means for deriving a clipped non-linear signal comprises:
    A. means for amplifying the non-linear signal by a fixed factor,
    B. means for supplying a constant value signal, and
    C. clipping means for comparing the amplified non-linear signal with the constant value signal to provide the larger of the compared signals as said clipped non-linear signal.

* * * * *